July 16, 1935.  H. U BAKER  2,007,996
MACHINE FOR MAKING STOVEPIPE CASING
Filed July 18, 1932  3 Sheets-Sheet 1
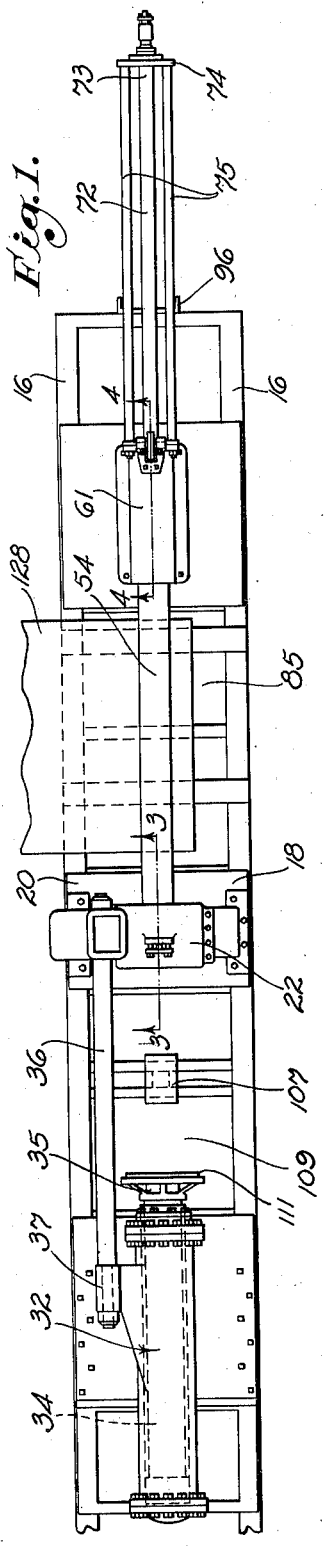
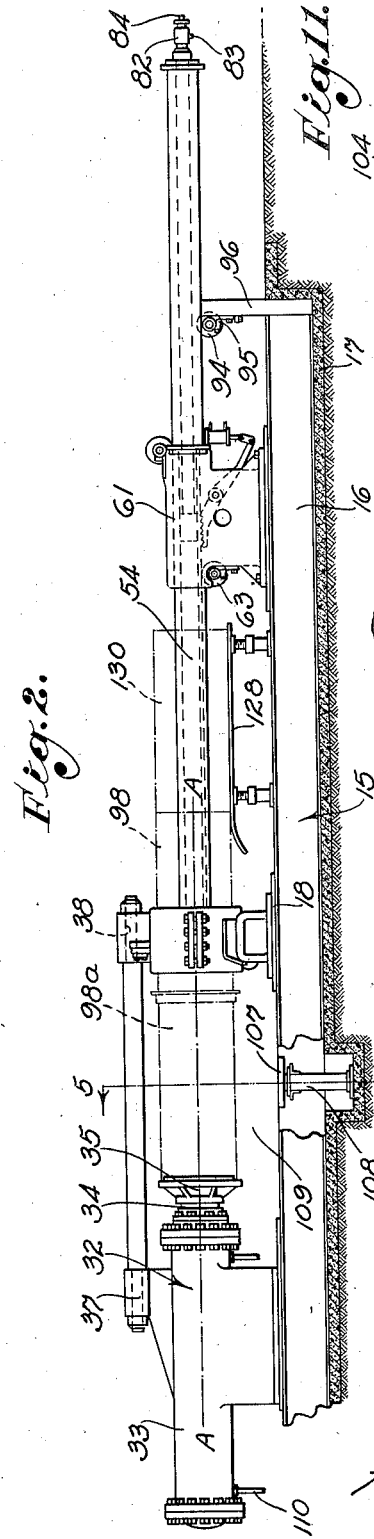
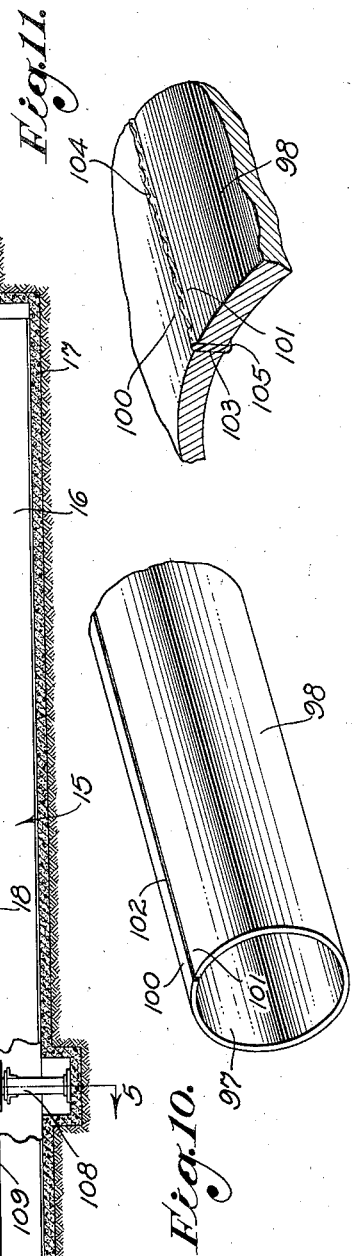
INVENTOR:
Harold U. Baker,
BY
ATTORNEY.

July 16, 1935. H. U. BAKER 2,007,996
MACHINE FOR MAKING STOVEPIPE CASING
Filed July 18, 1932 3 Sheets-Sheet 2
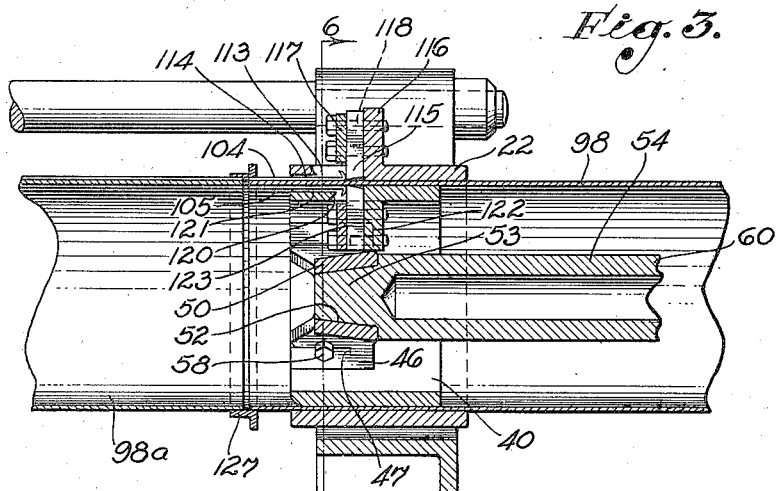
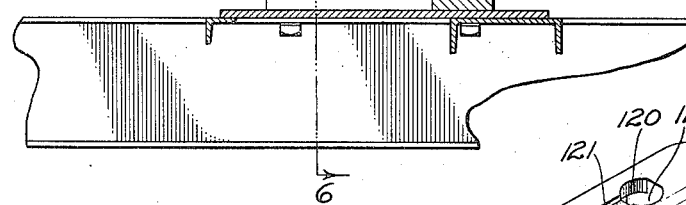
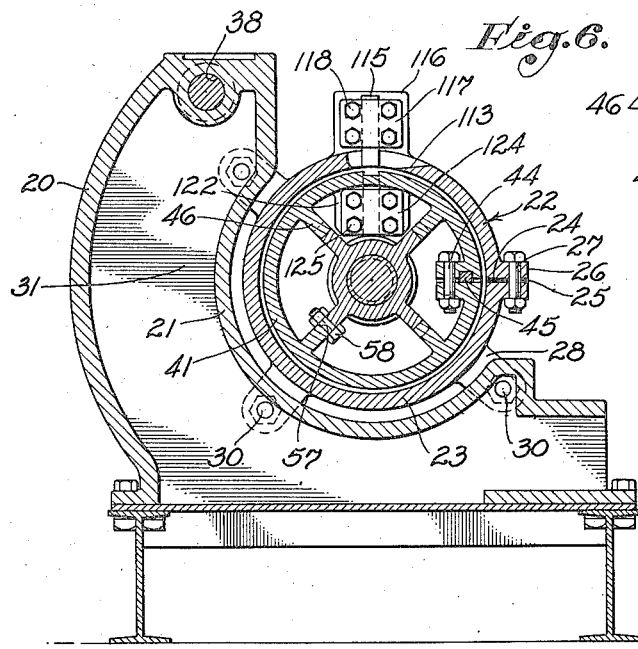
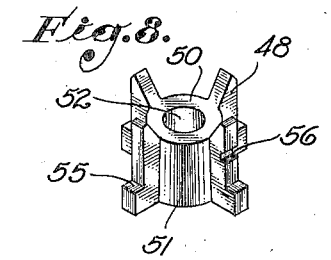
INVENTOR:
Harold U. Baker,
By
ATTORNEY.

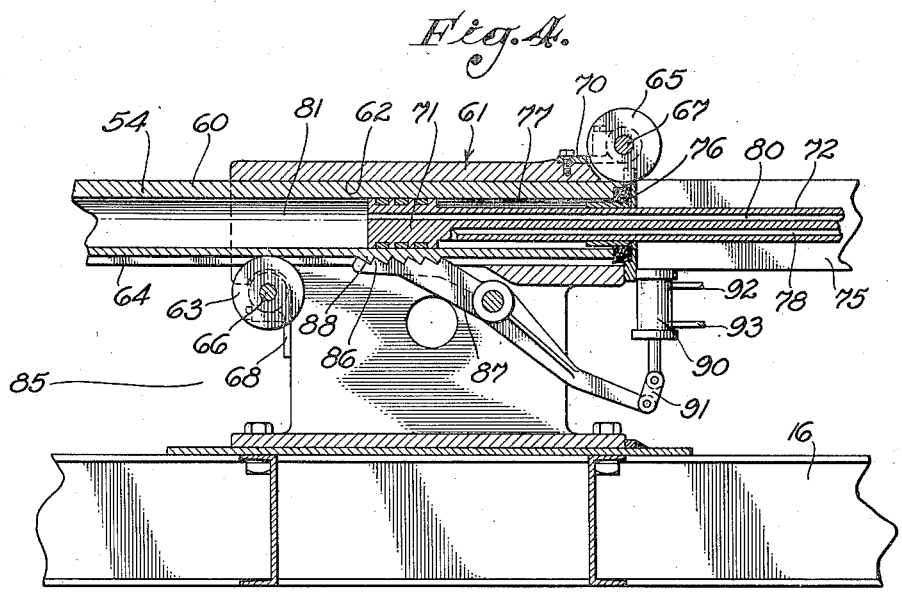
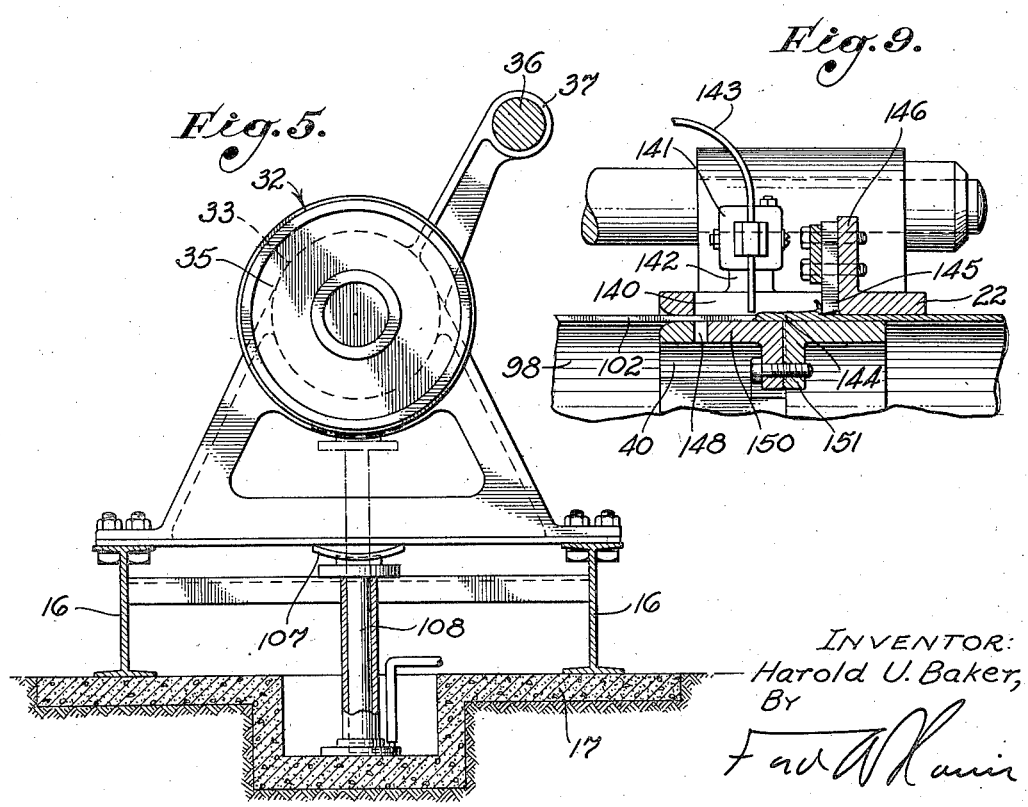

Patented July 16, 1935

2,007,996

UNITED STATES PATENT OFFICE 2,007,996

MACHINE FOR MAKING STOVEPIPE CASING

Harold U. Baker, South Pasadena, Calif.

Application July 18, 1932, Serial No. 623,053

34 Claims. (Cl. 29—33)

My invention relates to the art of making pipe or casing, such as stovepipe casing used at the surface of an oil well or in the lining of water wells.

As commonly used, stovepipe casing consists of inner and outer tubular members placed one within the other and with the joints thereof overlapping, the result being that no flanges or threaded couplings are required. These casing members have in the past been made of sheet steel rolled into tubular form with the edges thereof overlapped and riveted together, and of late years stovepipe casing has been made in some relatively few instances by welding the seams electrically.

The inner and outer tubular members constituting a stovepipe casing should be snugly fitted if a rigid structure of maximum strength is to be attained in an assembly of stovepipe casing members. To closely fit the inner and outer members is difficult in the methods of manufacture now followed.

My present invention has for one of its objects to provide a machine for economically making stovepipe casing members of practically true cylindrical form and with a minimum tolerance in diametral dimension.

It is an object of the invention to provide a device which will receive a sheet of metal rolled to tubular form and will weld the longitudinal seam, trim the weld, and size the tubular part thus formed, in a continuous operation. The device is so constructed that it will size the inner diameters of the outer casing members and the external diameters of the inner casing members.

It is an object of my invention to provide a device of the above character having an outer sizing die and an inner sizing head or die, there being an annular space between these members through which the casing part is passed. The invention provides means for forcing a tubular member, consisting of a sheet of steel rolled into tubular form, through this annular space, and means for welding the seam and trimming the weld during the passage of the tubular member through the annular space, the finished casing part being diametrally sized by the inner and outer die members.

It is an object of the invention to provide a device of the character set forth in the preceding paragraph having a pusher equipped with a head adapted to engage the tubular member and force it through the annular space provided by the die members, and having an axially extending bar for holding the inner head or die member within the outer die member during the forcing of the tubular member therethrough, there being means for moving the bar to and from engagement with the inner die member so that the tubular members may be moved in a lateral direction relative to the longitudinal axis of the device.

Further objects and advantages of the invention will be set forth in the following part of the specification.

Referring to the drawings, which are for illustrative purposes only,

Fig. 1 is a plan view of a preferred form of my invention.

Fig. 2 is an elevation corresponding to Fig. 1.

Fig. 3 is an enlarged fragmentary section on a plane represented by the line 3—3 of Fig. 1.

Fig. 4 is an enlarged fragmentary section on a plane represented by the line 4—4 of Fig. 1.

Fig. 5 is an enlarged cross section on a plane represented by the line 5—5 of Fig. 2.

Fig. 6 is a cross section on a plane represented by the line 6—6 of Fig. 3.

Fig. 7 is a perspective view of the inner die member shown in the drawings.

Fig. 8 is a perspective view of the spider for supporting the inner die member.

Fig. 9 is a fragmentary sectional view showing the manner in which an automatic welding head is employed in the practice of the invention as an alternative to welding the longitudinal seam of a tubular member before it is finished while being moved through the annular space formed by the die members.

Fig. 10 is a fragmentary perspective view showing a pipe seam prior to welding.

Fig. 11 is a partly sectioned, fragmentary perspective view showing a seam formed by flash welding.

The preferred form of my machine, shown in the drawings, includes a base 15 including longitudinal structural members such as I-beams 16 set into a concrete foundation or floor 17. On a plate 18 disposed at substantially the center of the base 15 a support 20 is mounted, this support, as shown in Fig. 6, having a semi-circular wall 21 disposed on the longitudinal axis of the machine and being adapted to receive an outer die member 22 embodying a cylindrical steel wall 23 having a split 24 along one side thereof in which shims 25 are removably placed for varying the diameter of the outer die member 22, there being flanges 26 along the split 24 through which bolts 27 are passed for securing purposes. Extending outwardly from the rightward or rearward portion of the die member 22 are lugs 28 by which the die member 22 is secured to the support 20 through the use of bolts 30 which thread into a side wall 31 of the support 20.

At the leftward end of the base 15 is a motivating or pushing device 32 comprising a cylinder 33, a piston 34 operative within the cylinder 32, and a pushing head 35 on the forward or rightward end of the piston 34. The motivating device 32 is tied to the support 29 by virtue of its being secured to the longitudinal beams 16 of the base 15 and may be further tied to the support 29 by use of a tie bar 36, the ends of which extend through a boss 37 on the motivating device 32 and an opening 38 in the upper part of the support 29.

An inner die member 40 of cylindrical form is placed within the outer die member, as best shown in Figs. 3 and 6. This die member comprises a cylindrical wall 41 having a split 42 at one side thereof, with flanges 43 along the split 42 which may be bolted together by means of bolts 44, there being a longitudinal wedge 45 for determining the separation of the flanges 43 and consequently the diameter of the inner die member 40 within a limited range. Projecting inwardly from the wall 41 of the inner die member 40 are ribs or webs 46 having shoulders 47 on their inner edges, these webs 46 being adapted to engage outwardly extending webs 48 of a spider 50 which has an annular wall 51 with a conical bore 52 therein adapted to receive the conical head 53 of a thrust bar 54. The webs 48 of the spider 50 are provided with shoulders 55 adapted to engage the shoulders 47 of the inner die member, and in one of the webs 48 of the spider 50 is a semi-circular notch 56 which cooperates with a notch 57 in a web 46 of the inner die member 40 to provide an opening for a bolt 58, which bolt 58 has the purpose of keeping the webs 48 and 46 in alignment and preventing removal of the spider 50 from the interior of the inner die member 40.

The purpose of the thrust bar 54 is to prevent rightward movement of the inner die member 40 during the operation of the device, and the thrust bar has a tubular wall 60 forming a movable cylinder which is supported in a thrust head 61 mounted at the rightward or rearward end of the base 15. This thrust head 61 has a longitudinal opening or bore 62, as shown in Fig. 4, with a wheel or roll 63 at its leftward end adapted to engage a longitudinal groove or keyway 64 formed in the underside of the thrust bar 54, and a wheel or roller 65 at its rightward end adapted to bear against the upper face of the thrust bar 54, the rollers 63 and 65 being respectively mounted on shafts 66 and 67 carried by brackets 68 and 70. Within the cylinder formed by the wall 60 is a stationary piston 71 mounted on the leftward end of a bar 72 which has its rightward end 73, as shown in Fig. 1, secured to a cross bar 74 mounted at the rightward ends of beams 75 which extend rightwardly from the thrust head 61. At the rightward end of the wall 60 a suitable closure or packing means 76 is provided for forming a chamber 77 within the cylindrical wall 60 to the right of the piston 71. Extending longitudinally within the stationary bar 72 is a fluid passage 78, the inner or leftward end of which communicates with the chamber 77, and also extending within the bar 72 is a fluid passage 80 which communicates with a chamber 81 formed within the cylindrical wall 60 to the left of the piston 71. Mounted at the extreme rightward end of the bar 72 is a fitting 82 having a nipple 83 adapted to be connected to fluid piping and communicating with the rightward end of the passage 78, and a nipple 84 which communicates with the passage 80 and is adapted to be connected to fluid piping.

Referring to Fig. 4, when fluid under pressure is delivered into the chamber 77, the pressure thereof against the closure means 76 at the rightward end of the wall 60 results in rightward movement of the thrust bar 54, withdrawing the head 53 thereof from engagement with the bore 52 of the spider 50 and moving the thrust bar 54 into its extreme rightward position, leaving the space 85 between the support 20 and the thrust head 61 exposed. By directing fluid through the passage 80 into the chamber 81, the thrust bar 54 may be moved into operative position, at which time the teeth 86 of a locking lever 87 will engage teeth 88 formed on the thrust bar 54 to prevent rearward or rightward movement of the thrust bar 54 as the result of pressure received from the inner die member 40. The locking lever 87 may be actuated by use of a hydraulic cylinder-piston means 90 which is connected to the lever 87 by means such as a link 91, the cylinder-piston means 90 having fluid pipes 92 and 93 communicating with the ends thereof for transmission of the fluids used in actuating such device 90. When the thrust bar 54 is in operative position as shown in Fig. 1, it is supported by the rollers 63 and 65. When it is withdrawn so as to leave the space 85 clear, it is supported on the roller 63 and a roller 94 carried by a bracket 95 mounted on a post 96 at the rightward end of the base 15.

In the practice of my invention a tubular member consisting of a sheet of metal rolled to cylindrical form may be welded either before its placement in the machine hereinbefore described or may be welded while in place in the machine, the welding of the tubular member in the machine requiring merely the addition of an automatic electric welding head of well known form. In the practice of my invention where the casing members are welded either externally of the machine or before being moved through the die members for sizing and trimming, a sheet of metal 97 is rolled to tubular form so as to form a tube blank 98 as shown in Fig. 10, the longitudinal edges 100 and 101 of the sheet 97 being brought into conjunction or approximate engagement to form a slit or seam 102 therebetween. The seam 102 of the tube blank 98 is then welded electrically by what is known as the flash method, with the result that the edges 100 and 101 of the sheet 97 are joined by a longitudinal, welded seam 103 which has metal ribs or flashes 104 and 105 therealong.

The welded tubular member 98 is then placed on a platform 107 of a hydraulic elevator or jack 108 mounted below the space 109 between the members 22 and 32, as shown in Figs. 1 and 2, and is raised by the jack 108 to such position that its axis will be substantially aligned with the axis A—A of the machine. Hydraulic fluid is then introduced into the cylinder 33 through piping 110 to force the piston 34 rightwardly, thereby bringing the head 35 into engagement with the leftward end of the member 98, there being an annular shoulder 111 formed on the rightward face of the head 35 for centralizing the member 98. Continued movement of the piston 34 in rightward direction is then employed to force the member 98 nearly all of the way through the die member 22. In Fig. 3 I show the member 98 in position within the die member 22 and ready to be forced on through the die member 22 by a second tubular member 98a.

As shown in Figs. 3 and 6, an opening 113 is formed in the leftward upper portion of the die member 22, and in the inner wall of the die member 22 a groove or slot 114 is extended leftwardly from the opening 113 to the leftward end of the die member 22, this groove being of sufficient size to receive the bead or flash 104 of the welded seam 103. At the rightward end of the opening 113 means is provided for supporting a trimming tool 115, such means being shown as an upstanding lug or flange 116 and a clamping plate 117 which is forced against the upper portion of the tool 115 by screws 118 which thread into the flange 116. In the inner die member 40, which is held in place within the outer die member 22 by the thrust bar 54, an opening 120 is formed opposite the opening 113, and a groove or slot 121 is extended in the outer face of the die member 40 leftwardly from the opening 120 to the leftward end of the inner die member 40. An inwardly extending lug or flange 122 is provided at the rightward end of the opening 120 for supporting an inner trimming tool 123, there being a clamping plate 124 secured for this purpose on the flange 122 by means of screws 125. During the relatively slow rightward movement of the member 98 through the annular space between the die members 22 and 40, the beads or flashes 104 and 105 are removed by the trimming tools 115 and 123, and the member 98 is sized. Where the tubular or pipe member thus formed is employed in stovepipe casing or well casing, one of such members extends within two adjacent similar members so that the well casing thus formed consists of two layers of tubular members extending one within the other in such a manner that the end joints of the outer members are offset from the end joints of the other members. Accordingly, the member 98 must be sized either externally or internally, depending upon whether it is to be used as an inner casing member or an outer casing member; therefore, for any given size of stovepipe well casing two sets of inner and outer die members 22 and 40 are employed. In one set of dies the external diameter of the member 98 is controlled by the internal diameter of the die member 22, and in the other set of dies the internal diameter of the member 98 is controlled by the external diameter of the member 40.

As may be understood from the foregoing description, the member 98 has been forced through the die member 22 to the position shown in Fig. 3 by the head 35. The head 35 is then withdrawn to retracted position as shown in Figs. 1 and 2, and the second member 98a is raised into axially aligned position by the jack 108. A guide ring 127 may be placed as shown in Fig. 3 to overlap the adjacent ends of the members 98 and 98a so as to hold these ends in alignment. The head 35 is then moved rightwardly, with the result that the member 98 of Fig. 3 is forced on through the die member 22 by the member 98a which then assumes the position occupied by the member 98. The member 98 on leaving the die member 22 is received on an adjustable table 128, as indicated by dotted lines 130 in Fig. 2. The latch lever 87 is then moved into disengaged position, and fluid under pressure is delivered through the inlet nipple 83, by use of suitable piping not shown, and the thrust bar 54 is moved rightwardly, withdrawing the conical head 53 thereof from the inner die member 40, so as to clear the space 85 and permit the finished pipe member to be rolled from the position indicated by the dotted lines 130. The thrust bar 54 is then returned to engagement with the inner die member 40 by the application of fluid under pressure to the chamber 81. The further operation is then merely a repetition of the procedure above described.

In Fig. 9 I show the small change necessary in my equipment whereby to enable the practice of the invention in its complete form wherein the longitudinal seam of the pipe is welded and trimmed and the pipe is sized in a continuous operation. The outer die member 22 is provided with an opening 140 in the upper wall thereof larger than the opening 113 shown in Fig. 3, and over the leftward or forward end of this opening an automatic welding head 141 is supported by means of a bracket 142. The welding head 141 is adapted to automatically feed a wire or electrode 143 so as to fill the slit or seam 102 of the tubular member 98 with a weld 144, which weld may be cooled by a blast of air, and then as the member 98 moves rightwardly it is trimmed by a trimming tool 145 supported on an upright wall 146. The inner die member 40 has an opening 148 disposed below the opening 140 in which a copper backing-up plate 150 is supported in an adjustable manner on a support 151. In this complete practice of the invention the tubular blank 98 shown in Fig. 10 is delivered directly from the forming rolls to the machine, and the formation of a finished pipe member is performed in the machine in a continuous operation with the exception of the short interruption required for the placing of new tubular members 98 in position to be forced through the die member 22.

By making a flat or submerged weld it is possible to avoid the use of the trimming tool, although in the general practice of the invention it is desirable to make a rounded weld and trim the same so that a seam of maximum strength is obtained.

In bringing water wells into production it is customary to set the casing in the hole and then, by use of an insert perforating tool, to perforate the casing within the water-bearing zone. The old style of riveted, lapped-seam casing required that considerable care be taken to avoid the seams while perforating owing to the danger of opening a seam while attempting to force a perforating tool through the casing at the seam. Experience shows that casing made in accordance with my invention may be perforated directly through the seam without possibility of injuring the casing owing to the high percentage of strain maintained in the seam.

Herein I have described outer and inner die members 22 and 40. It is to be understood that in the practice of the invention only one of these die members need be in working engagement with the tubular member 98 to bring it to a desired size, and that at such time the other die member operates in the capacity of a guide. Where the outer die member 22 is being used to size the member 98, the inner die member prevents buckling of the member 98.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A device of the character described, for forming pipe from a tubular member comprised of a metal sheet with its longitudinal edges in conjunction, including: an outer forming die means having an inner tubular surface flared at its forward end to receive said tubular member; an inner forming die means within said outer forming die means having an outer face spaced from said outer forming die means a distance to permit passage of said tubular member between said forming die means; means for holding said inner forming die means within said outer forming die means; means for relatively moving said tubular member and said outer and inner forming die means; means for welding together said longitudinal edges of said tubular member during its movement through said outer forming die means; and means associated with said die means for removing the extruding portions of the weld before the pipe moves from said die means.

2. A device of the character described, for forming pipe from a tubular member comprised of a metal sheet with its longitudinal edges in conjunction, including: an outer forming die having an inner tubular surface flared at its forward end to receive said tubular member, there being an opening in the wall of said outer forming die; an inner forming die within said outer forming die having an outer face spaced from said outer forming die a distance to permit passage of said tubular member between said forming dies; releasable means for holding said inner forming die within said outer forming die; means for moving said tubular member through said outer forming die; welding means positioned so as to operate through said opening in said outer forming die, for welding together said longitudinal edges of said tubular member as it is moved by said moving means; and means for smoothing the weld as it is moved in the device.

3. A device of the character described, for forming pipe from a tubular member comprised of a metal sheet with its longitudinal edges in conjunction, including: an outer forming die means of tubular form adapted to receive said tubular member; an inner forming die means axially aligned with said outer forming die means; a support for said inner forming die means; motivating means for moving said tubular member through said outer forming die means and over said inner forming die means; and welding means for welding together said longitudinal edges of said tubular member during its movement through said outer forming die means, said die means guiding said tubular member as it moves adjacent said welding means.

4. A device of the character described, for forming pipe from a tubular member comprised of a metal sheet with its longitudinal edges in conjunction, including: an outer forming die means of tubular form adapted to receive said tubular member; an inner forming die means axially aligned with said outer forming die means; a support for said inner forming die means; motivating means for moving said tubular member between said die means; welding means for welding together said longitudinal edges of said tubular member during its movement between said die means, said guide means guiding said tubular member as it moves adjacent said welding means; and means for trimming the welded seam thus formed.

5. A device of the character described, for forming pipe from a tubular member comprised of a metal sheet with its longitudinal edges in conjunction and joined by a projecting weld, including: an outer forming die of tubular form adapted to receive said tubular member; an inner forming die axially aligned with said outer forming die; a support for said inner forming die; means for moving said support into and out of engagement with said inner forming die; motivating means for moving said tubular member through said outer forming die and over said inner forming die; and means associated with said forming dies for removing the extruding portions of the weld from said tubular member as it is moved by said motivating means.

6. A device of the character described, for forming pipe from a tubular member comprised of a metal sheet with its longitudinal edges in conjunction, including: an outer forming die of cylindrical form adapted to receive said tubular member; an inner forming die of a size to fit within said tubular member; a bar for supporting said inner forming die, said bar detachably engaging said inner forming die and being mounted so as to move axially from engagement with said inner forming die; and means for pushing said tubular member through said outer forming die and over said inner forming die.

7. A device of the character described, for forming pipe from a tubular member comprised of a metal sheet with its longitudinal edges in conjunction, including: an outer forming die of cylindrical form adapted to receive said tubular member; an inner forming die disposed within said outer forming die; a bar for supporting said inner forming die, said bar detachably engaging said inner forming die and being mounted so as to move axially from engagement with said inner forming die; and means for pushing said tubular member through said outer forming die and over said inner forming die.

8. A device of the character described, for forming pipe from a tubular member comprised of a metal sheet with its longitudinal edges in conjunction, including: an outer forming die of cylindrical form adapted to receive said tubular member; an inner forming die disposed within said outer forming die; a bar for supporting said inner forming die, said bar detachably engaging said inner forming die and being mounted so as to move axially from engagement with said inner forming die; means for pushing said tubular member through said outer forming die and over said inner forming die; and means for welding together the longitudinal edges of said tubular member as it is moved by said pushing means and prior to its passage past said forming dies.

9. A device of the character described, for forming pipe from a tubular member comprised of a metal sheet with its longitudinal edges in conjunction, including: an outer forming die of cylindrical form adapted to receive said tubular member; an inner forming die disposed within said outer forming die; a bar for supporting said inner forming die, said bar detachably engaging said inner forming die and being mounted so as to move axially from engagement with said inner forming die; means for pushing said tubular member through said outer forming die and over said inner forming die; and means for welding together said edges of said tubular member prior to the movement of said tubular member through said outer forming die, and trimming the weld thus formed during movement of said tubular member.

10. A device of the character described, for forming pipe from a tubular member comprised of a metal sheet with its longitudinal edges in conjunction, including: an outer forming die of cylindrical form adapted to receive said tubular member; a cylinder spaced from and aligned with said outer forming die; a piston in said cylinder having a head adapted to force said tubular member through said outer forming die; an inner forming die within said outer forming die; a bar extending rearwardly from said inner forming die, said bar detachably engaging said inner forming die; supporting means engaging the rearward end of said bar for holding it in engagement with said inner forming die; and hydraulic means for moving said bar from engagement with said inner forming die.

11. A device of the character described, for forming pipe from a tubular member comprised of a metal sheet with its longitudinal edges in conjunction, including: an outer forming die of cylindrical form adapted to receive said tubular member; a cylinder spaced from and aligned with said outer forming die; a piston in said cylinder having a head adapted to force said tubular member through said outer forming die; an inner forming die within said outer forming die; a bar extending rearwardly from said inner forming die, said bar detachably engaging said inner forming die; supporting means engaging the rearward end of said bar for holding it in engagement with said inner forming die; hydraulic means for moving said bar from engagement with said inner forming die; and means between said cylinder and said forming dies for supporting said tubular member in a position of axial alignment with said forming dies.

12. A device of the character described, for forming pipe from a tubular member comprised of a metal sheet with its longitudinal edges in conjunction, including: an outer forming die of cylindrical form adapted to receive said tubular member; a cylinder spaced from and aligned with said outer forming die; a piston in said cylinder having a head adapted to force said tubular member through said outer forming die; an inner forming die within said outer forming die; a bar extending rearwardly from said inner forming die; said bar detachably engaging said inner forming die; supporting means engaging the rearward end of said bar for holding it in engagement with said inner forming die; hydraulic means for moving said bar from engagement with said inner forming die; means between said cylinder and said forming dies for supporting said tubular member in a position of axial alignment with said forming dies; and means between said forming dies and said supporting means for said bar for receiving said tubular member from said forming dies.

13. A device of the character described for sizing a tubular member, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending rearwardly from said inner die, said bar detachably engaging said inner die; supporting means engaging the rearward end of said bar for holding it in engagement with said inner die during the operation of said pusher means to push said tubular member through said outer die and over said inner die; and means for moving said bar from engagement with said inner die.

14. A device of the character described for sizing a tubular member, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending rearwardly from said inner die, said bar detachably engaging said inner die; supporting means engaging the rearward end of said bar for holding it in engagement with said inner die during the operation of said pusher means to push said tubular member through said outer die and over said inner die; means for moving said bar from engagement with said inner die; and supporting means between said pusher means and said dies for supporting said tubular member in a position of axial alignment with said dies.

15. A device of the character described for sizing a tubular member, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending rearwardly from said inner die, said bar detachably engaging said inner die; supporting means engaging the rearward end of said bar for holding it in engagement with said inner die during the operation of said pusher means to push said tubular member through said outer die and over said inner die; means for moving said bar from engagement with said inner die; supporting means between said pusher means and said dies for supporting said tubular member in a position of axial alignment with said dies; and means between said dies and said supporting means for said bar for receiving said tubular member from said dies and supporting the same after removal of said bar from engagement with said inner die.

16. A device of the character described for sizing a tubular member, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending rearwardly from said inner die, said bar detachably engaging said inner die; supporting means engaging the rearward end of said bar for holding it in engagement with said inner die during the operation of said pusher means to push said tubular member through said outer die and over said inner die; means for moving said bar from engagement with said inner die; and means between said dies and said supporting means for said bar for receiving said tubular member from said dies and supporting the same after removal of said bar from engagement with said inner die.

17. A device of the character described for sizing a tubular member, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending axially from said inner die for holding said inner die axially aligned with said outer die, said bar being detachable from said inner die; means for supporting the outer end of said bar during the forcing of said tubular member through said outer die and over said inner die; and means for moving said bar axially from engagement with said inner die.

18. A device of the character described for sizing a tubular member, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending axially from said inner die for holding said inner die axially aligned with said outer die, said bar being detachable from said inner die; means for supporting the outer end of said bar during the forcing of said tubular member through said outer die and over said inner die; means for moving said bar axially from engagement with said inner die; and supporting means between said pusher means and said dies for supporting said tubular member in a position of axial alignment with said dies.

19. A device of the character described for sizing a tubular member, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending axially from said inner die for holding said inner die axially aligned with said outer die, said bar being detachable from said inner die; means for supporting the outer end of said bar during the forcing of said tubular member through said outer die and over said inner die; means for moving said bar axially from engagement with said inner die; supporting means between said pusher means and said dies for supporting said tubular member in a position of axial alignment with said dies; and means between said dies and said supporting means for said bar for receiving said tubular member from said dies and supporting the same after removal of said bar from engagement with said inner die.

20. A device of the character described for sizing a tubular member comprised of a metal sheet having its longitudinal edges connected by a weld, including: an outer die adapted to receive said tubular member; pusher means spaced from the forward end of said outer die, said pusher means comprising a pusher head adapted to engage an end of said tubular member, and means for motivating said pusher head toward said outer die; an inner die axially aligned with said outer die; a bar extending rearwardly from said inner die, said bar detachably engaging said inner die; supporting means engaging the rearward end of said bar for holding it in engagement with said inner die during the operation of said pusher means to push said tubular member through said outer die and over said inner die; means for moving said bar from engagement with said inner die; and trimming means for smoothing the weld of said tubular member.

21. A device of the character described for sizing a tubular member, including: an inner die; means for supporting said inner die in a position of operation, including a bar detachably engaging said die, means engaging the outer end of said bar for supporting the same, and means for moving said bar axially from engagement with said die so as to leave said die in its position of operation; and pusher means spaced from the forward end of said die, said pusher means comprising a pusher head for engaging an end of said tubular member, and means for motivating said pusher head toward said die so as to force said tubular member over said die.

22. A device of the character described for forming pipe from a tubular member comprised of sheet metal with its longitudinal edges in conjunction, including: an outer forming die means of tubular form adapted to receive said tubular member; an inner forming die means axially aligned with said outer forming die means; means for holding said inner forming die means within said outer forming die means; and means causing relative movement between said tubular member and said die forming means so as to move said tubular member through said outer forming die means and over said inner forming die means.

23. A device of the character described for forming pipe from a tubular member comprised of sheet metal with its longitudinal edges in conjunction, including: an outer forming die means of tubular form adapted to receive said tubular member; an inner forming die means axially aligned with said outer forming die means; means for holding said inner forming die means within said outer forming die means; means causing relative movement between said tubular member and said die forming means so as to move said tubular member through said outer forming die means and over said inner forming die means; and means for welding together the longitudinal edges of said tubular member during its movement through said outer forming die means.

24. A device of the character described for forming pipe from a tubular member comprised of sheet metal with its longitudinal edges in conjunction, including: an outer forming die means of tubular form adapted to receive said tubular member; an inner forming die means within said outer forming die means and having its outer surface spaced therefrom a distance to permit passage of said tubular member between said forming die means; means for supporting said inner forming die means within said outer forming die means; actuating means for moving said supporting means into and out of engagement with said inner forming die means; and means for moving said tubular member through said outer forming die means and over said inner forming die means.

25. A device of the character described for forming pipe from a tubular member comprised of sheet metal with its longitudinal edges in conjunction, including: an outer forming die means of tubular form adapted to receive said tubular member; an inner forming die means within said outer forming die means and having its outer surface spaced therefrom a distance to permit passage of said tubular member between said forming die means; means for supporting said inner forming die means within said outer forming die means; actuating means for moving said supporting means into and out of engagement with said inner forming die means; and means causing relative movement between said tubular member and said outer and inner forming die means.

26. A device of the character described for forming pipe from a tubular member comprised of a metal sheet with its longitudinal edges in conjunction, including: an outer forming die of tubular form adapted to receive said tubular member; an inner forming die disposed within said outer forming die; a bar for supporting said inner forming die; means for holding said bar in engagement with said inner forming die; means for moving said bar into and out of engagement with said inner forming die; and means causing relative movement between said tubular member and said inner and outer forming dies.

27. A device of the character described for forming pipe from a tubular member comprised of a metal sheet with its longitudinal edges in conjunction, including: an outer forming die of tubular form adapted to receive said tubular member; an inner forming die disposed within said outer forming die; a bar for supporting said inner forming die; means for holding said bar in engagement with said inner forming die; means for moving said bar into and out of engagement with said inner forming die; means causing relative movement between said tubular member and said inner and outer forming dies; and means for welding together the longitudinal edges of said tubular member during the movement between said tubular member and said inner and outer forming dies.

28. A device of the character described for forming pipe from a tubular member comprised of a metal sheet with its longitudinal edges in conjunction, including: an outer forming die of tubular form adapted to receive said tubular member; an inner forming die disposed within said outer forming die; a bar for supporting said inner forming die; means for holding said bar in engagement with said inner forming die; means for moving said bar into and out of engagement with said inner forming die; means causing relative movement between said tubular member and said inner and outer forming dies; means for welding together the longitudinal edges of said tubular member during the movement between said tubular member and said inner and outer forming dies; and means associated with said inner and outer forming dies for removing the extruding portions of the weld.

29. A device of the character described for forming pipe from a tubular member comprised of a metal sheet with its longitudinal edges in conjunction, including: an outer forming die of tubular form adapted to receive said tubular member; an inner forming die disposed within said outer forming die; a bar for supporting said inner forming die; means for holding said bar in engagement with said inner forming die; means for moving said bar into and out of engagement with said inner forming die; means causing relative movement between said tubular member and said inner and outer forming dies; means for welding together the longitudinal edges of said tubular member during the movement between said tubular member and said inner and outer forming dies; and means associated with said outer forming die for removing the extruding portions of the weld.

30. A device of the character described for forming pipe from a tubular member comprised of a metal sheet with its longitudinal edges in conjunction, including: outer forming die means adapted to receive said tubular member; inner forming die means disposed within said outer forming die means; means for supporting said inner forming die means within said outer forming die means; means for moving said inner forming die supporting means into and out of engagement with said inner forming die means; means causing relative movement between said tubular member and said inner and outer forming die means; means for welding together the longitudinal edges of said tubular member during the movement between said forming die means; and means associated with one or the other of said forming die means for removing the extruding portions of the weld.

31. A combination as set forth in claim 30 which includes a means for changing the width of the space between said inner and outer forming die means.

32. A combination as set forth in claim 30 which includes a means associated with said inner forming die means for changing the width of the space between said outer and inner forming die means.

33. A combination as set forth in claim 24 which includes a means for changing the diameter of said inner forming die means.

34. A combination as set forth in claim 24 which includes a means associated with said inner forming die means for changing the width of the space between said inner and outer forming die means.

HAROLD U. BAKER.